(12) United States Patent
Shih

(10) Patent No.: US 12,522,267 B2
(45) Date of Patent: Jan. 13, 2026

(54) TRAIN FOREWARNING BRAKING SYSTEM

(71) Applicant: Jui Yuan Shih, Changhua County (TW)

(72) Inventor: Jui Yuan Shih, Changhua County (TW)

( * ) Notice: Subject to any disclaimer, the term of this patent is extended or adjusted under 35 U.S.C. 154(b) by 74 days.

(21) Appl. No.: 18/396,928

(22) Filed: Dec. 27, 2023

(65) Prior Publication Data

US 2024/0217568 A1 Jul. 4, 2024

(30) Foreign Application Priority Data

Dec. 30, 2022 (TW) ................................ 111150968

(51) Int. Cl.
| | |
|---|---|
| *B61L 27/20* | (2022.01) |
| *B61L 13/02* | (2006.01) |
| *B61L 15/00* | (2006.01) |
| *B61L 23/04* | (2006.01) |
| *B61L 25/02* | (2006.01) |
| *B61L 27/70* | (2022.01) |
| *H04N 7/18* | (2006.01) |
| *H04N 23/90* | (2023.01) |

(52) U.S. Cl.
CPC ............... *B61L 27/20* (2022.01); *B61L 13/02* (2013.01); *B61L 15/0036* (2013.01); *B61L 15/009* (2013.01); *B61L 23/045* (2013.01); *B61L 25/02* (2013.01); *B61L 27/70* (2022.01); *H04N 7/181* (2013.01); *H04N 23/90* (2023.01)

(58) Field of Classification Search
CPC .......... B61L 27/20; B61L 27/70; B61L 27/53; B61L 13/02; B61L 15/0036; B61L 15/009; B61L 15/0094; B61L 15/0062; B61L 23/045; B61L 23/041; B61L 23/044; B61L 23/047; B61L 25/02; H04N 7/181; H04N 23/90; B60T 13/665; B60T 17/228; B16H 7/12; F16D 63/008
USPC ................................................. 701/19, 20, 70
See application file for complete search history.

(56) References Cited

U.S. PATENT DOCUMENTS

| | | | |
|---|---|---|---|
| 11,208,129 B2 | 12/2021 | Kumar et al. | |
| 2022/0262260 A1 | 8/2022 | Gur | |
| 2024/0212197 A1 * | 6/2024 | Barrio Crespo | .......... G06T 7/20 |

FOREIGN PATENT DOCUMENTS

| | | | | |
|---|---|---|---|---|
| CA | 3217373 A1 * | 12/2022 | ............ | B61L 23/041 |
| CN | 101020466 A | 8/2007 | | |
| DE | 102004015244 B4 * | 4/2007 | ............... | B61K 9/08 |
| EP | 1213202 A1 * | 6/2002 | ............... | B61K 9/08 |

(Continued)

*Primary Examiner* — Hai H Huynh
(74) *Attorney, Agent, or Firm* — RABIN & BERDO, P.C.

(57) ABSTRACT

A train forewarning braking system is disposed between a train and a track for the train to travel on, is electrically connected to a traffic control center, and has an image monitoring module. The image monitoring module is disposed around the track, is electrically connected to a control system of the train and the traffic control center, and has multiple image capture units and multiple display units. The image capture units are disposed at spaced intervals near the track and are electrically connected to the control system of the train to capture images of the environment around the track. The display units are disposed on the train and the traffic control center, and are electrically connected to the control system to display the images captured by each one of the image capture units.

26 Claims, 16 Drawing Sheets

(56) References Cited

FOREIGN PATENT DOCUMENTS

| EP | 4032782 A1 | 7/2022 |
|---|---|---|
| PL | 239778 B1 | 1/2022 |

\* cited by examiner

TRAIN FOREWARNING BRAKING SYSTEM

BACKGROUND

1. Field of the Invention

The present invention relates to a train forewarning braking system, and more particularly to a train forewarning braking system that can provide an early warning effect, can improve driving safety, and can provide an auxiliary braking effect.

2. Description of Related Art

During a driving process of a conventional rail transportation system, collisions often occur due to obstacles on tracks of the conventional rail transportation system, resulting in major accidents. The conventional rail transportation system mainly uses a brake shoe/air brake system to brake, but it requires a long braking distance to brake. For emergencies or close-range accidents, the effect of instant braking cannot be effectively achieved. Therefore, there is a need to improve the control, braking, and safety issues of the conventional rail transportation system.

To overcome the shortcomings, the present invention tends to provide a train forewarning braking system to mitigate the aforementioned problems.

SUMMARY

Since the braking distance required for braking of the conventional rail transportation system is very long, it is necessary to set up an image monitoring system to transmit real-time images on a traveling route of a train to respond early and avoid accidents. Additionally, the traveling route of the train of the conventional rail transportation system is a dedicated fixed rail route, so necessary image monitoring modules can be set up at specific required locations. In view of the shortcomings of the conventional rail transportation system that requires manual braking and safety control, after continuous research and testing, an invention was finally developed that can improve on the above-mentioned shortcomings.

A train forewarning braking system in accordance with the present invention is disposed between a train and a track for the train to travel on, is electrically connected to a traffic control center, and has an image monitoring module. The image monitoring module is disposed around the track, is electrically connected to a control system of the train and the traffic control center, and has multiple image capture units and multiple display units. The image capture units are disposed at spaced intervals near the track and are electrically connected to the control system of the train to capture images of the environment around the track. The display units are disposed on the train and the traffic control center, and are electrically connected to the control system to display the images captured by each one of the image capture units.

Other objects, advantages and novel features of the invention will become more apparent from the following detailed description when taken in conjunction with the accompanying drawings.

BRIEF DESCRIPTION OF THE DRAWINGS

FIG. 2A is a further enlarged perspective side view of the train forewarning braking system in FIG. 2;

DETAILED DESCRIPTION OF PREFERRED EMBODIMENTS

Figure 1:
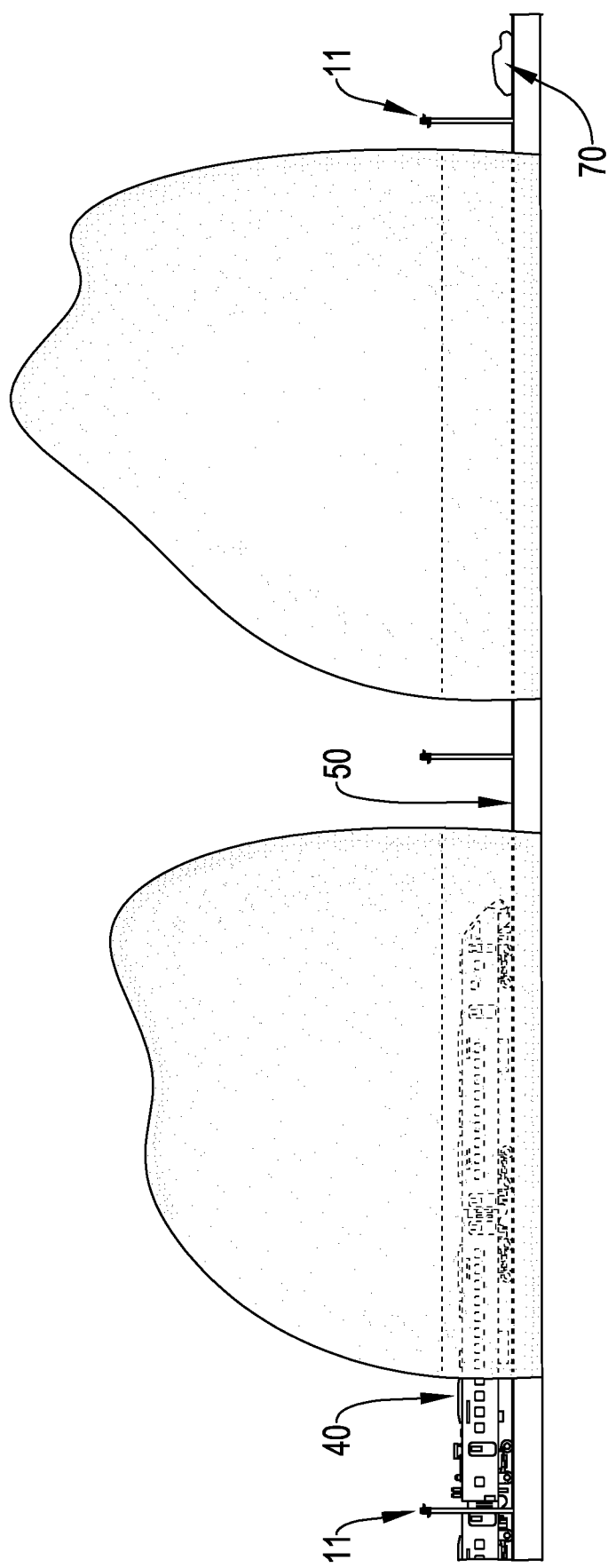
FIG. 1 is a perspective side view of a train forewarning braking system in accordance with the present invention.

With reference to FIGS. 1 to 5, a train forewarning braking system in accordance with the present invention is disposed between a train 40 and a track 50 for the train 40 to travel on, is electrically connected to a traffic control center 60, and has an image monitoring module 10 and an auxiliary braking module 20.

The image monitoring module 10 is disposed around the track 50 and is electrically connected to a control system 41 of the train 40. The train 40 is electrically connected to the traffic control center 60 via the control system 41 to transmit images captured by the image monitoring module 10 to the traffic control center 60. Then images of historical file data such as previous images or images at a fixed time can be compared by manual judgment or artificial intelligence computer to check for warnings of dangers, so that the train operator can respond immediately with early warning. When it is detected that the train operator is suddenly disabled and cannot control the train 40, the traffic control center 60 can intervene in time to control the train 40. When an emergency braking or major accident occurs, the traffic control center 60 can be notified synchronously to dispatch the subsequent train 40 to avoid a collision, and the traffic control center 60 will notify rescue units such as the military, police, and hospitals to provide relevant assistance, thereby shortening the time required to rescue the injured.

Figure 3:
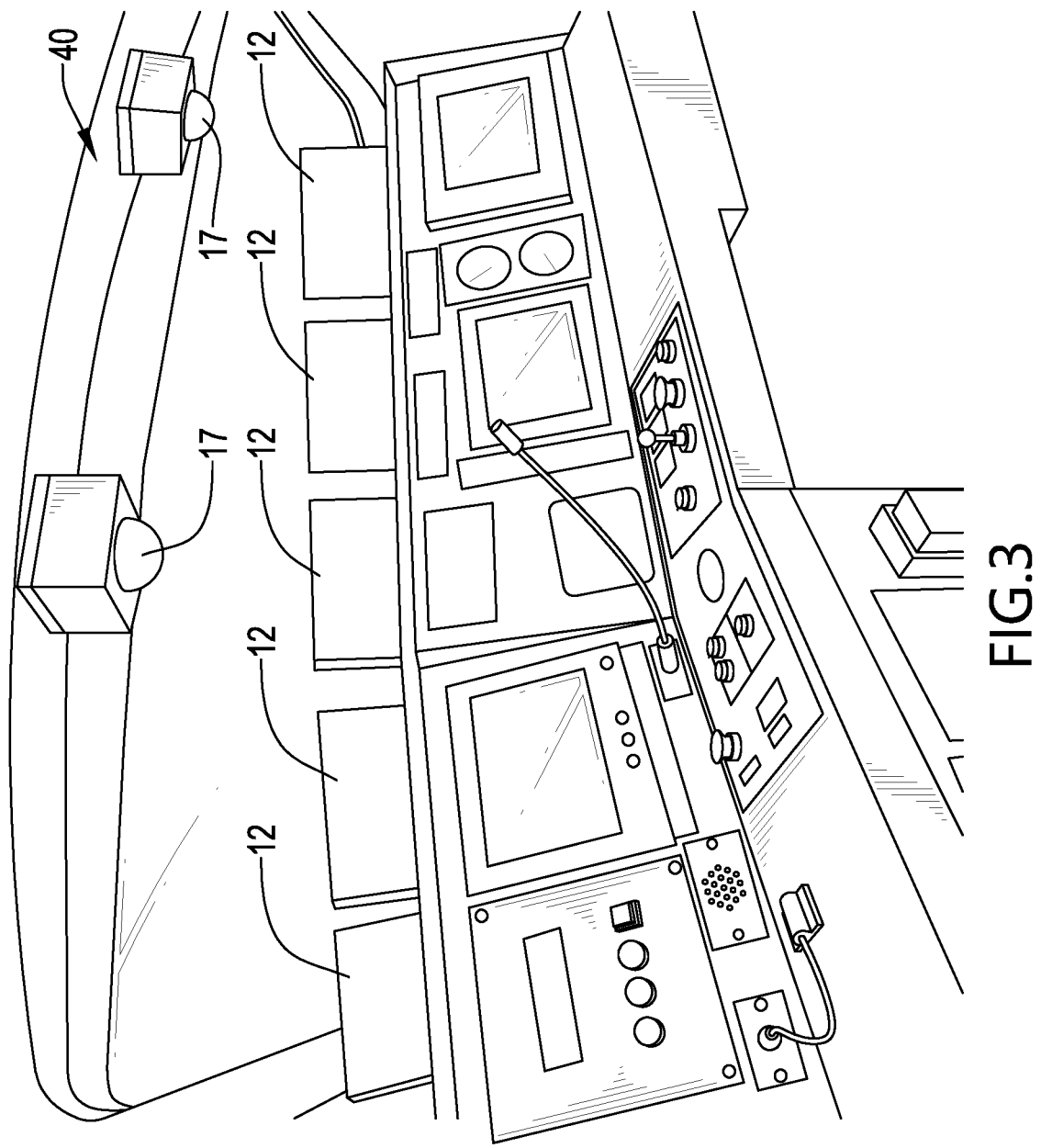
FIG. 3 is an enlarged perspective view of the train forewarning braking system in FIG. 1, disposed in a train.
Figure 4:
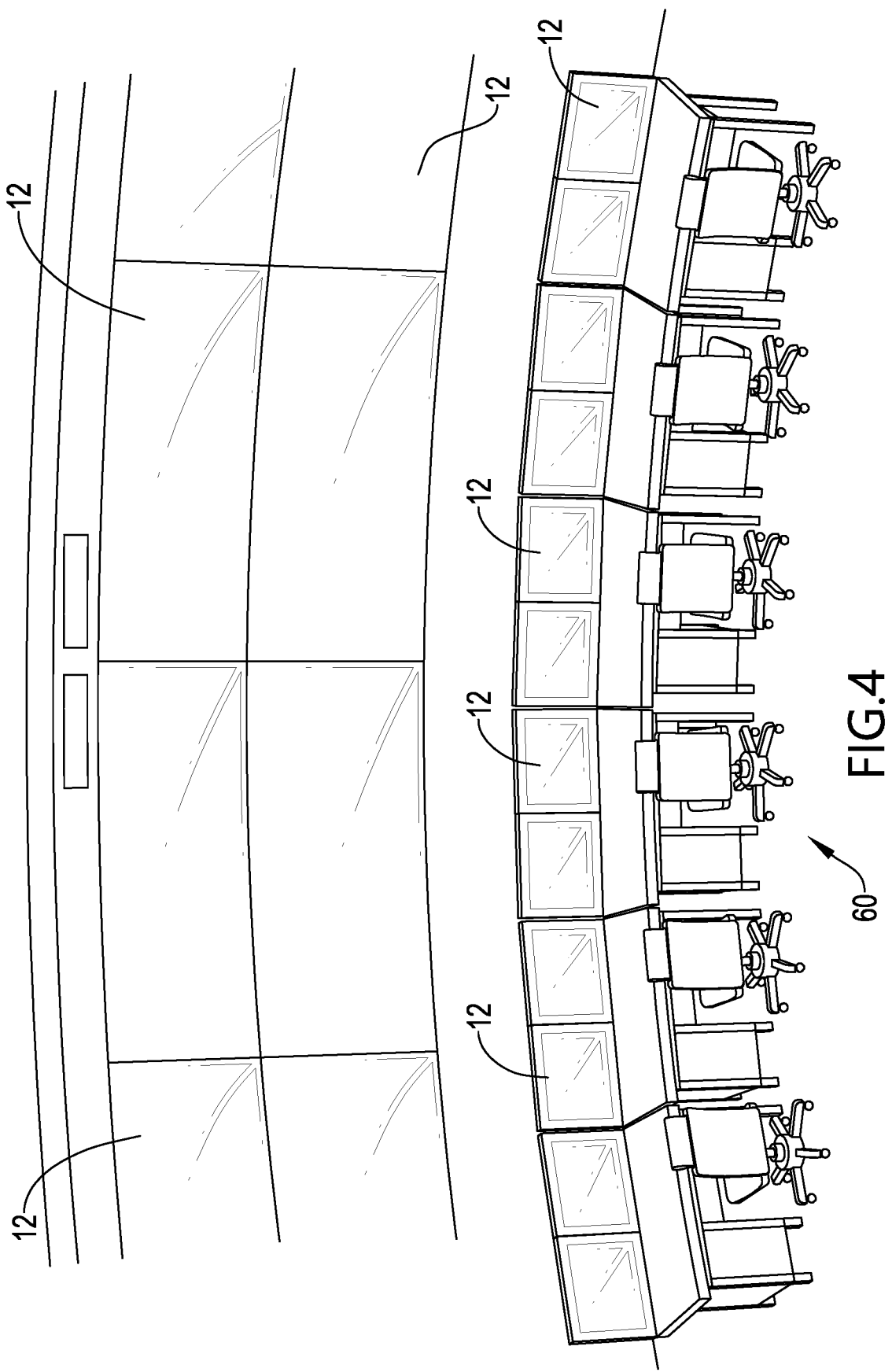
FIG. 4 is an enlarged perspective view of the train forewarning braking system in FIG. 1, disposed in a traffic control center.
Figure 5:
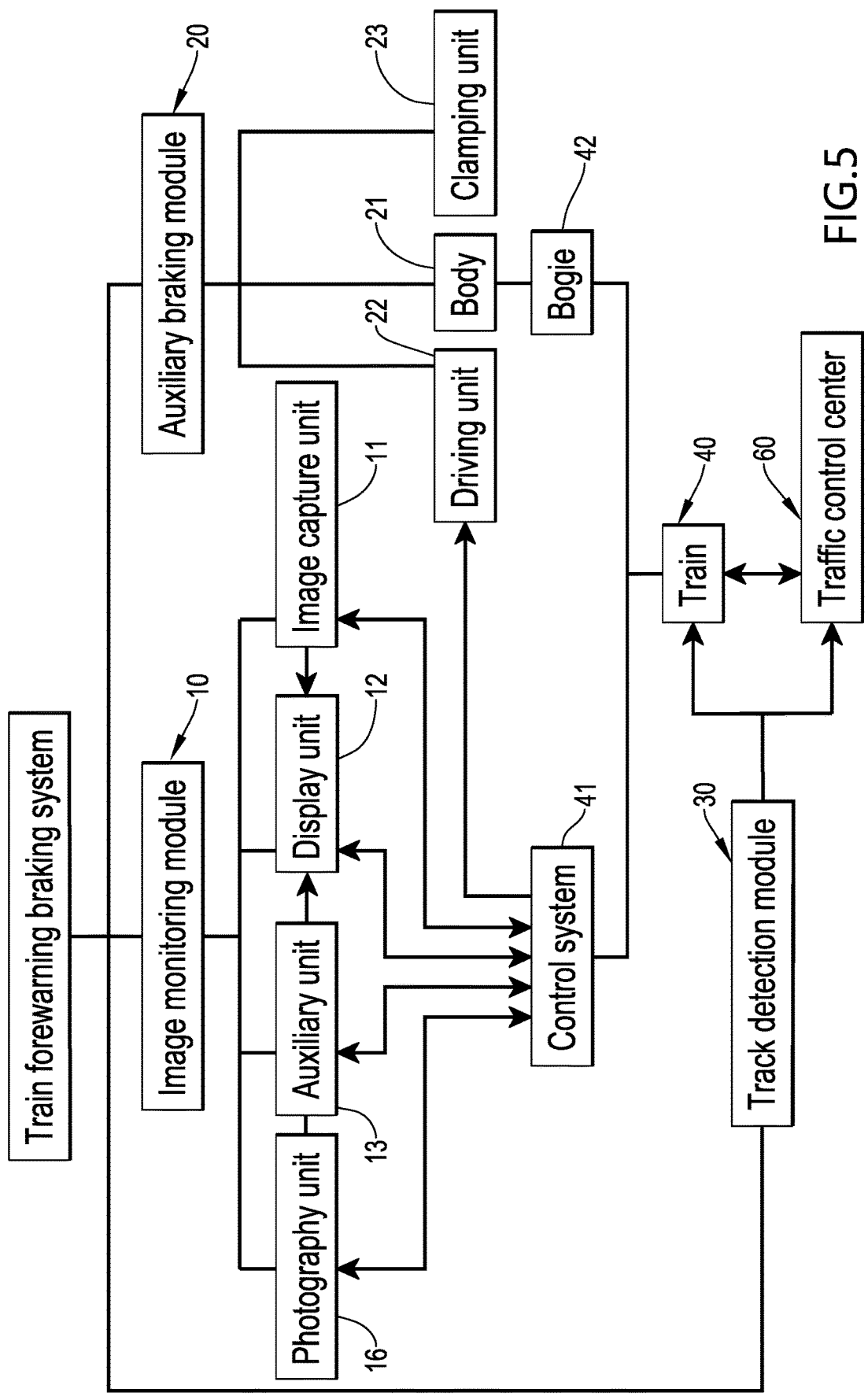
FIG. 5 is a circuit block diagram of the train forewarning braking system in FIG. 1.

The image monitoring module 10 has multiple image capture units 11, multiple display units 12, and an auxiliary unit 13. The image capture units 11 are disposed at spaced intervals near the track 50 and are electrically connected to the control system 41 of the train 40, so that the image capture units 11 may be disposed on two sides of the track 50 to capture images of the environment around the track 50. Preferably, with reference to FIG. 2, each one of the image capture units 11 has a fixed rod 14 and two cameras 15. The fixed rod 14 is fixed on one of the two sides of the track 50. The two cameras 15 are disposed on the fixed rod 14 and respectively face two different directions, so as to capture the images of the train 40 approaching and moving away. With reference to FIGS. 3, 4, and 5, the display units 12 are disposed on the train 40 and the traffic control center 60 and are electrically connected to the control system 41, and images captured by each one of the image capture units 11 are displayed on the display units 12. In addition, the image capture units 11 are disposed in sequence to capture images and the display units 12 display the images sequentially.

Figure 13:
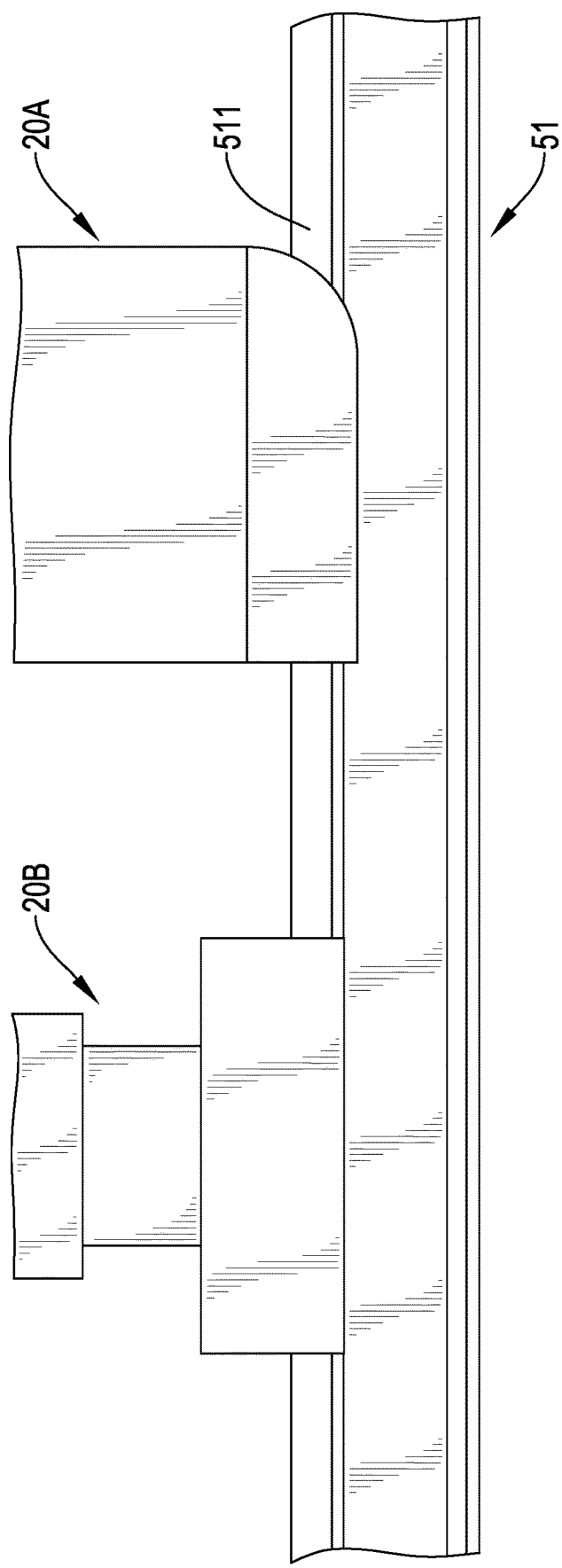
FIG. 13 is an enlarged side view of a fifth embodiment of an auxiliary braking module of the train forewarning braking system in accordance with the present invention.

With reference to FIG. 13, the auxiliary unit 13 may be an unmanned aerial vehicle (UAV) connected to the control system 41 of the train 40 to capture the images around the train 40, transmit the images to the train 40, and display the images on one of the display units 12 that is disposed on the train 40. Thereby, the images obtained by the image monitoring module 10 and the traffic control center 60 can be used to determine whether there is a fault or obstacle on the track 50 in front of the train 40, and immediately remind or provide a train operator (or an artificial intelligence computer) with an early warning or early braking operation.

Figure 2:
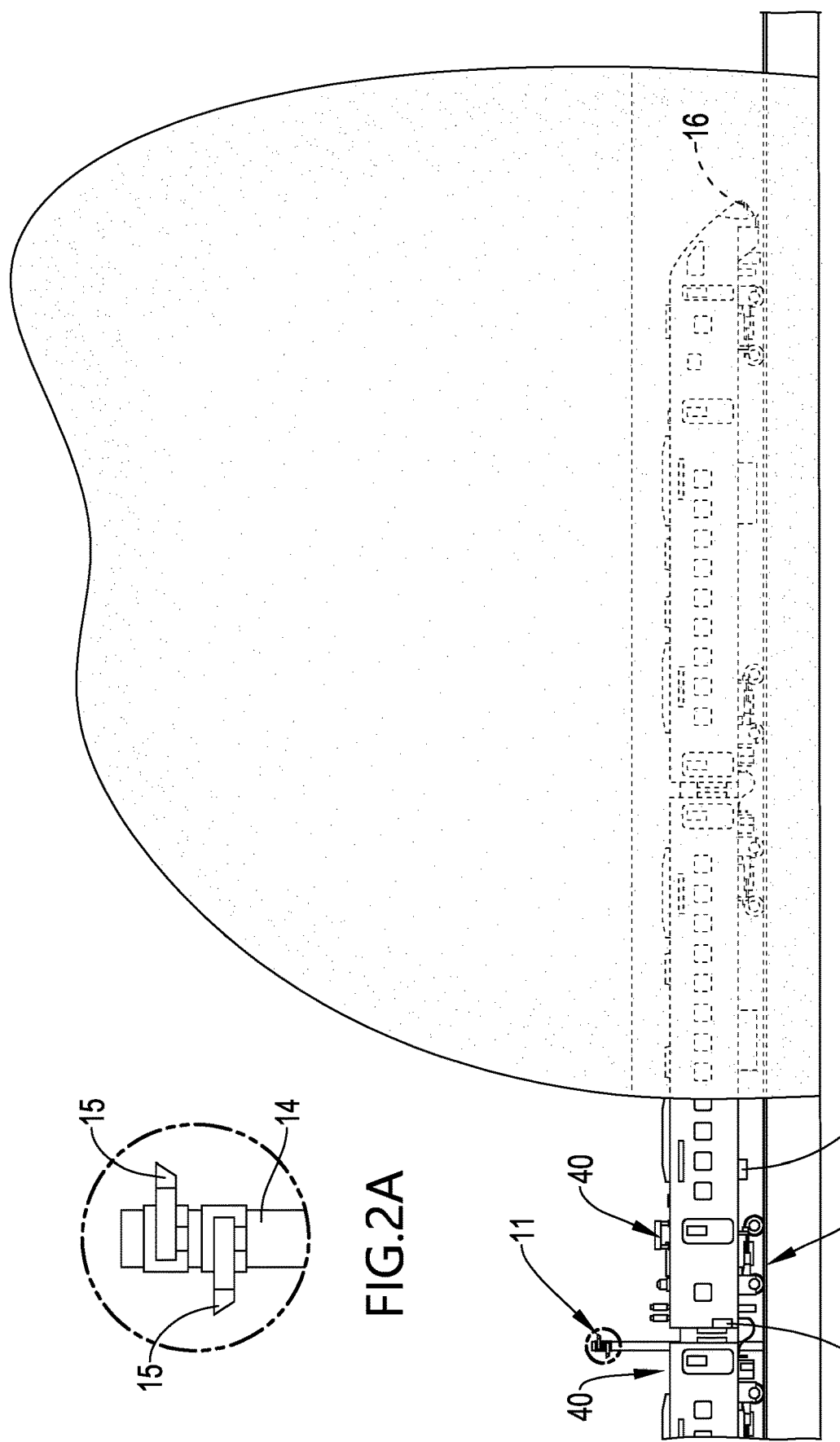
FIG. 2 is an enlarged perspective side view of the train forewarning braking system in FIG. 1.

Furthermore, with reference to FIGS. 2 and 5, the image monitoring module 10 is equipped with a series of camera apparatus that are disposed on the train 40, in a cab of the train 40, around the track 50, around a level crossing, around a bridge, a tunnel or necessary locations. It can transmit real-time images of an upcoming traveling route of the train 40 from hundreds of meters to several kilometers away to the train 40 for reference to the train operator, thereby extending the driving visual range and responding in advance to improve the safety of driving the train 40. Furthermore, the traffic control center 60 assists in paying attention to the conditions on the upcoming traveling route of the train 40.

According to the above, the image monitoring module 10 has at least one photography unit 16 disposed in front, behind, below or in a carriage of the train 40 to capture images of the front, rear, bottom and the carriage of the train 40 via the at least one photography unit 16 and transmit the images to the control system 41 and the traffic control center 60 to determine whether there are obstacles in front and behind the traveling route of the train 40, whether the track 50 is broken, faulty or deformed, and provide real-time reminders or information to the train operator for performing an early warning or early braking operation. Furthermore, the photography unit 16 disposed in the carriage of the train 40 can perform immediate and effective rescue and isolation for violent incidents in the carriage. When the train 40 encounters an emergency, a next train 40 on the same traveling route as the train 40 can be synchronously warned by the traffic control center 60 to respond in advance to avoid a collision.

In addition, if the traffic control center 60 determines that an unavoidable accident may occur with the train 40, the traffic control center 60 can intervene with the train 40 via the control system 41 to control and initiate emergency braking. With reference to FIG. 3, the train forewarning braking system has at least one driving recorder 17 disposed in the train 40 to record travelling images and various data of the train 40, to check and observe the physical condition of the train operator, and to check whether the equipment is being operated correctly, etc., and this can provide an early warning braking judgment to an artificial intelligence or the traffic control center 60. Additionally, accidents can be investigated to prevent similar accidents that may hinder the driving safety of the train 40 from happening again by using the at least one driving recorder 17.

Figure 6:
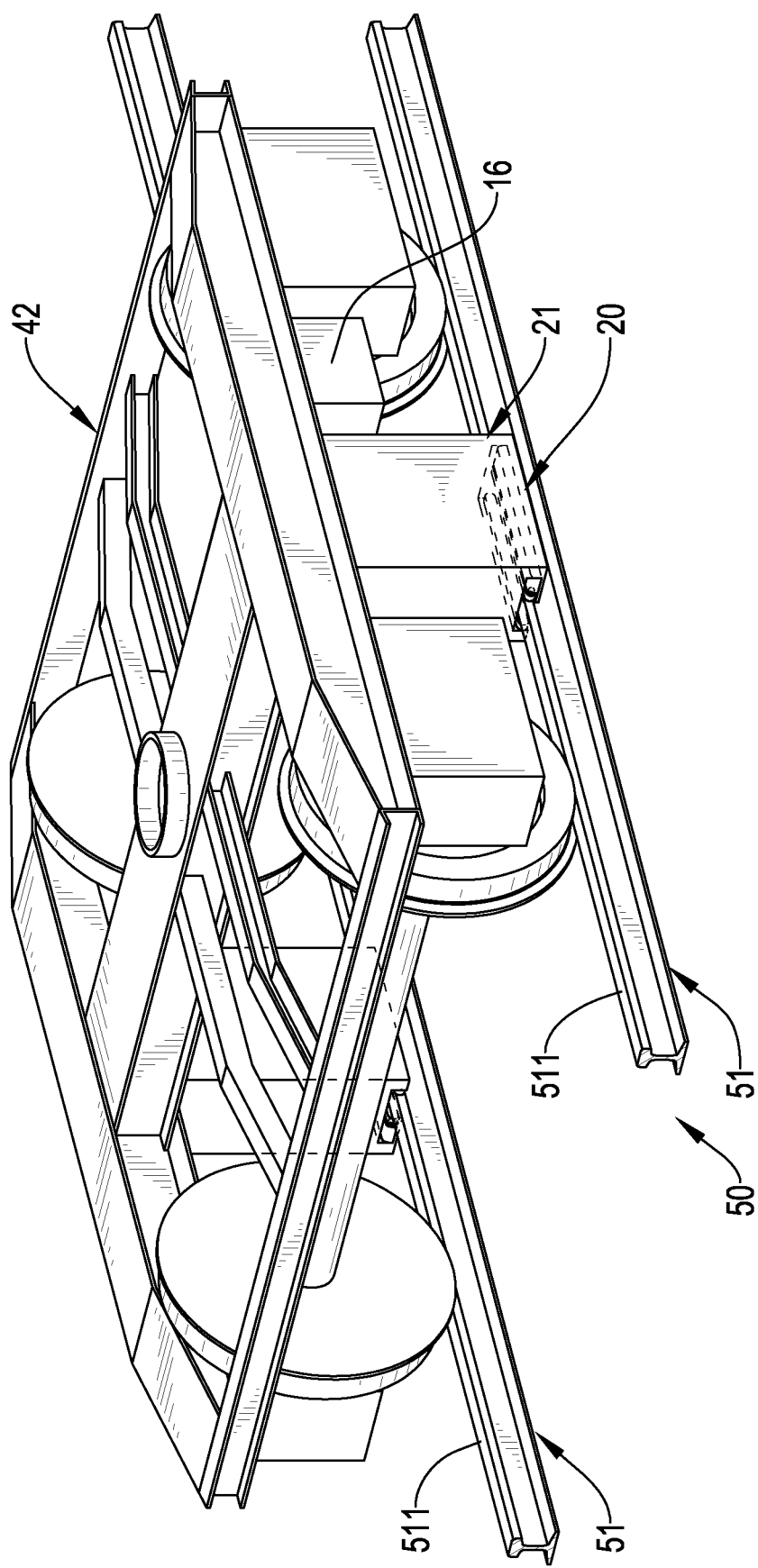
FIG. 6 is an enlarged perspective view of a first embodiment of an auxiliary braking module of the train forewarning braking system in accordance with the present invention.
Figure 7:
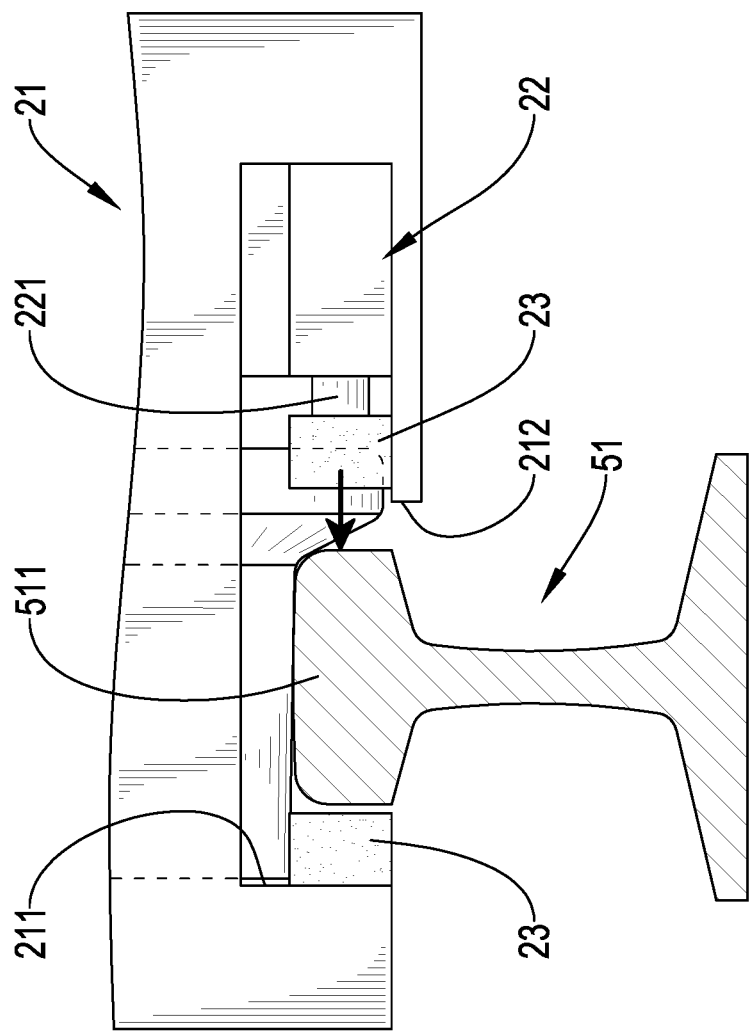
FIG. 7 is an enlarged side view in partial section of the auxiliary braking module of the train forewarning braking system in FIG. 6.

With reference to FIGS. 6 and 7, a first embodiment of the auxiliary braking module 20 of the present invention is disposed on the train 40, is electrically connected to the control system 41, is disposed below the train 40 or on a bogie 42 of the train 40 and faces rails 51 of the track 50. The auxiliary braking module 20 has a body 21, a driving unit 22, and two clamping units 23. The body 21 is securely mounted on a bottom of the bogie 42 and extends toward one of the rails 51 of the track 50, is connected to the bogie 42 with an up-and-down sliding relationship, and has a chamber 211 and an opening 212. The chamber 211 is formed in the body 21. The opening 212 is formed through a bottom of the body 21, communicates with the chamber 211, and spans two sides of the corresponding rail 51. The corresponding rail 51 has a rail head 511 disposed in the chamber 211 of the body 21 via the opening 212.

The driving unit 22 is disposed in the chamber 211 of the body 21, is disposed toward the rail head 511 of the corresponding rail 51, and has a driving rod 221 telescopically moved toward or away from the rail head 511 of the corresponding rail 51. The two clamping units 23 are disposed in the chamber 211 of the body 21 and are respectively located at two sides of the rail head 511 of the corresponding rail 51. One of the two clamping units 23 is disposed on a side wall of the chamber 211 away from the driving unit 22 and faces one of the two sides of the rail head 511 of the corresponding rail 51, and the other one of the two clamping units 23 is disposed on the driving rod 221 of the driving unit 22 and faces the other one of the two sides of the rail head 511 of the corresponding rail 51. Preferably, with reference to FIG. 5, the train forewarning braking system of the present invention has two said auxiliary braking modules 20 on each bogie 42 of the train 40 to respectively dispose on the two rails 51 of the track 50.

Preferably, a required power of the driving unit 22 can be provided by air brakes, hydraulic motors or magnetic means, and the auxiliary braking module 20 can be connected with brake shoes, disc brakes, and magnetic brakes of the train 40 or used alone as an emergency brake for the train 40. The auxiliary braking module 20 can be disposed on the front, rear or each carriage of the train 40, and can act synchronously or sequentially depending on the situation. Furthermore, the auxiliary braking module 20 has an anti-lock brake system (ABS) and can be started intermittently to avoid excessive braking force causing slippage or damage to the rail 51. In order to prevent the rail 51 from being moved due to auxiliary braking by the auxiliary braking module 20, the foundation structure of the rail 50 can be strengthened when the rail 50 is constructed.

With reference to FIG. 7, when the first preferred embodiment of the auxiliary braking module 20 is in use, as the train 40 is braked by an air brake system, the driving unit 22 can be synchronized to actuate via the control system 41 to move the driving rod 221 toward the rail head 511 of the corresponding rail 51, and the two sides of the rail head 511 of the corresponding rail 51 are respectively clamped by the two clamping units 23. The clamping friction of the two clamping units 23 provides an auxiliary braking effect for the train 40, which not only shortens the distance and reaction time required for braking the train 40, but also effectively improves the accuracy and safety of braking the train 40.

Figure 8:
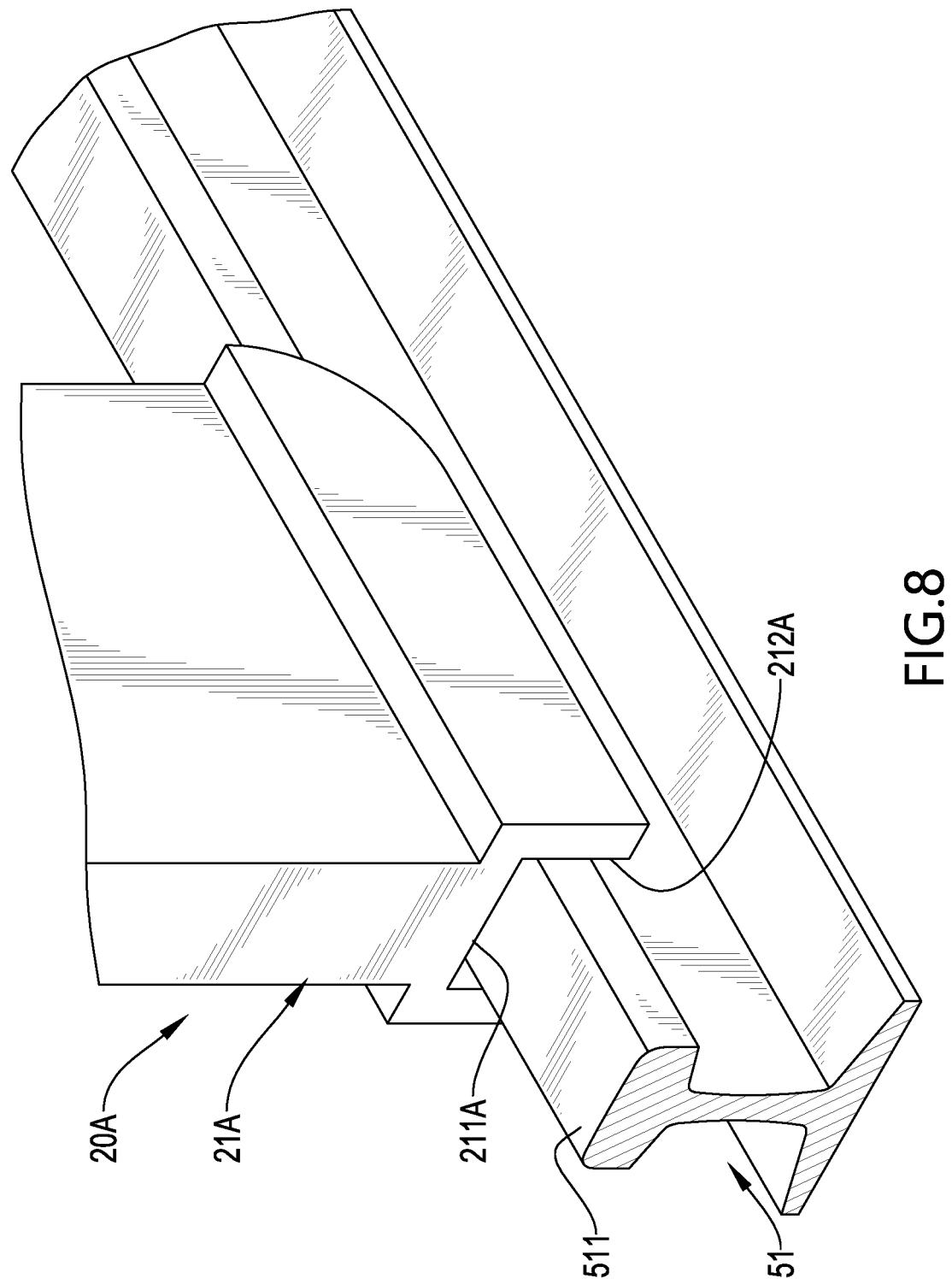
FIG. 8 is an enlarged perspective view of a second embodiment of an auxiliary braking module of the train forewarning braking system in accordance with the present invention.

With reference to FIG. 8, a second embodiment of an auxiliary braking module 20A of a train forewarning braking system in accordance with the present invention is substantially the same as the first embodiment except for the following features. In the second embodiment of the present invention, the bottom of the body 21A has a boat-shaped structure which can automatically raise and slide the corresponding rail 51 when it contacts a broken end of a turnout of the corresponding rail 51, thereby preventing the body 21A from being stuck with the broken end of the turnout. Furthermore, the opening 212A of the body 21A has a cross section same as a cross section of the chamber 211A, and this enables the rail head 511 of the corresponding rail 51 to be arranged in the chamber 211A of the body 21A. When the second embodiment of the auxiliary brake module 20A of the present invention is used, the operating principle and method of the second embodiment of the auxiliary brake module 20A are the same as those of the first embodiment of the auxiliary brake module 20, and will not be described here.

Figure 9:
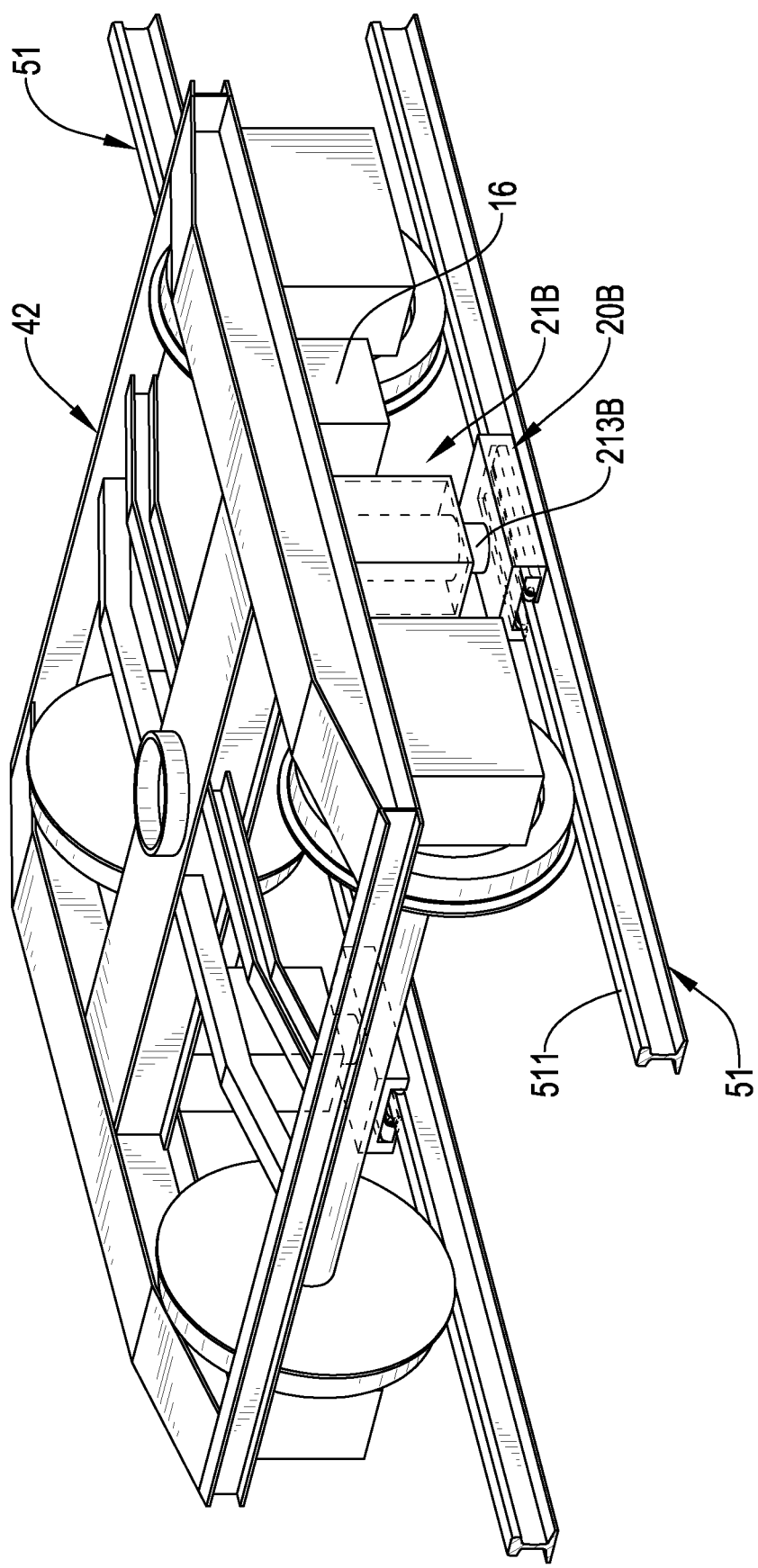
FIG. 9 is an enlarged perspective view of a third embodiment of an auxiliary braking module of the train forewarning braking system in accordance with the present invention.
Figure 10:
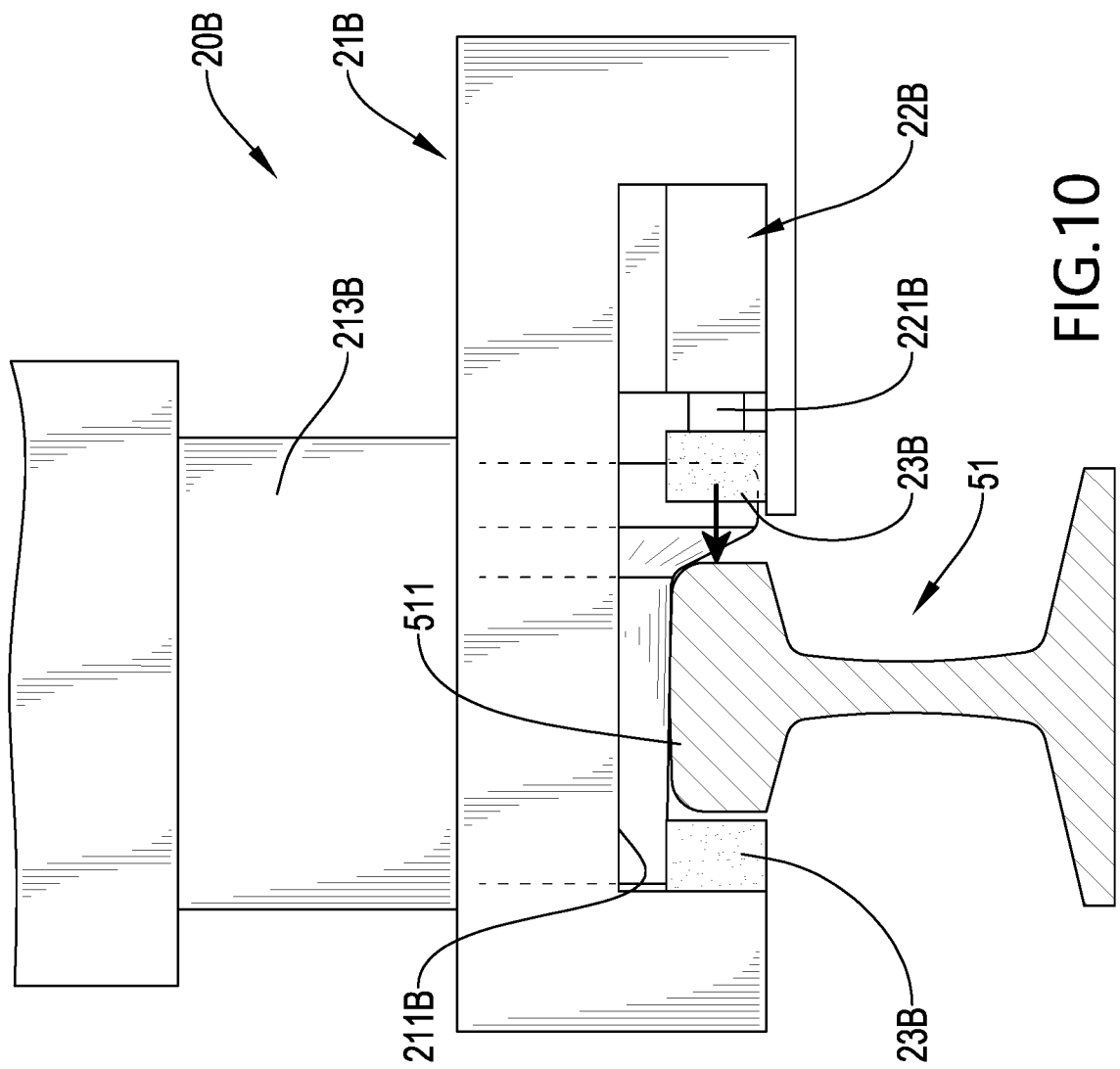
FIG. 10 is an enlarged and operational side view in partial section of the auxiliary braking module of the train forewarning braking system in FIG. 9, under an extended state.

With reference to FIGS. 9 and 10, a third embodiment of an auxiliary braking module 20B of a train forewarning braking system in accordance with the present invention is substantially the same as the first embodiment except for the following features. In the third embodiment of the present invention, the body 21B has a lifting rod 213B selectively moved toward or away from the rail head 511 of the corresponding rail 51 to enable the driving unit 22B and the two clamping units 23B disposed in the chamber 211 of the body 21B to approach or move away from the rail head 511 of the corresponding rail 51 by a movement of the lifting rod 213B of the body 21B. When the third embodiment of the auxiliary braking module 20B of the present invention is in use, as the train 40 is braked by the air brake system, the lifting rod 213B can be synchronized to move downwardly by the control system 41 to move the two clamping units 23B respectively facing the two sides of the rail head 511 of the corresponding rail 51, and the driving unit 22B also can be synchronized to actuate by the control system 41 to move the two clamping units 23B respectively toward and press against the two sides of the rail head 511 of the corresponding rail 51 to provide an auxiliary braking effect for the train 40.

Figure 11:
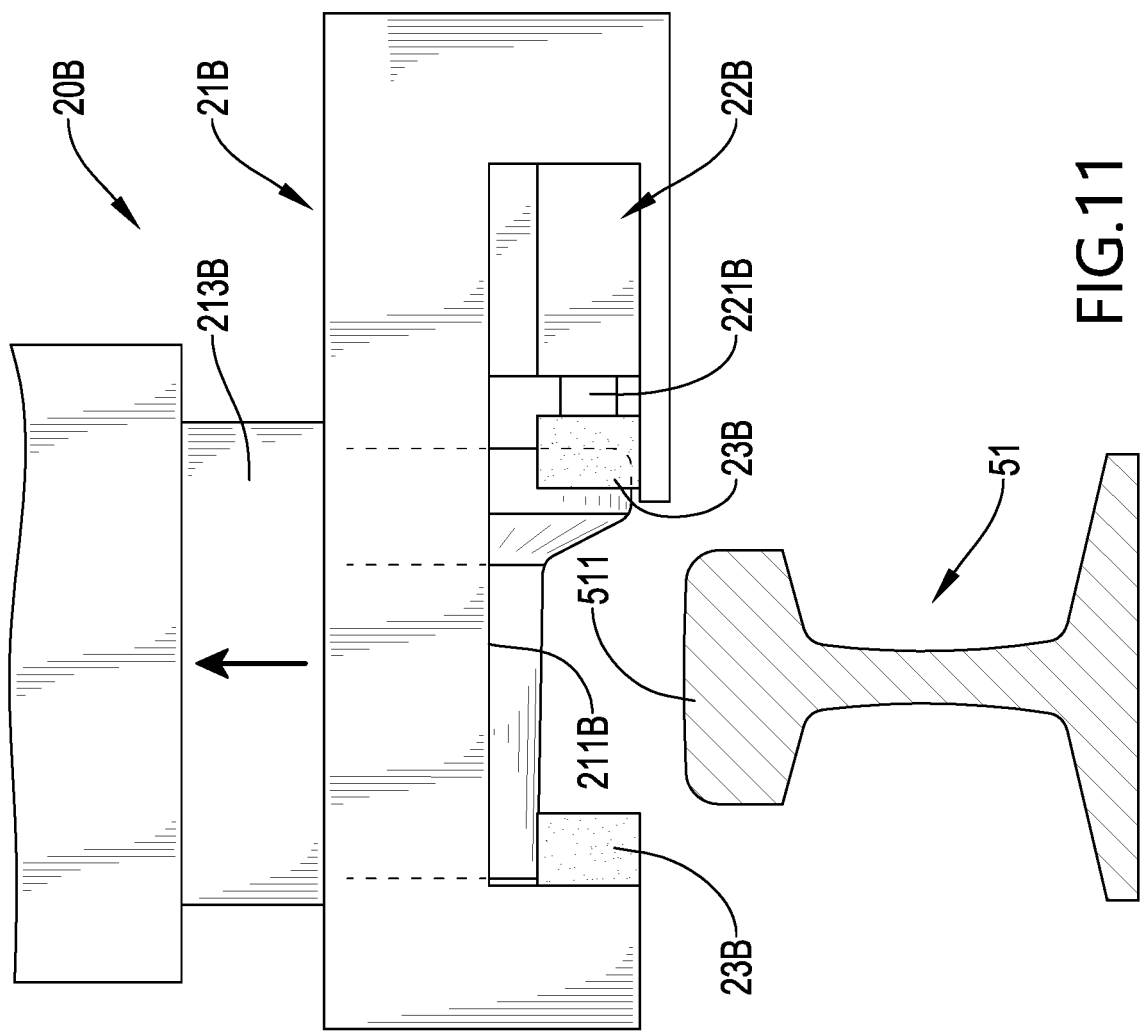
FIG. 11 is an enlarged and operational side view in partial section of the auxiliary braking module of the train forewarning braking system in FIG. 9, under a retracted state.

Furthermore, when the third embodiment of the auxiliary braking module 20B of the present invention is used, the lifting rod 213B may be maintained under an extended state, so that the two clamping units 23B are respectively maintained on two sides of the corresponding rail 51. In addition, with reference to FIG. 11, the lifting rod 213B may be maintained under a retracted state. When the train 40 is to brake, the lifting rod 213B is moved downwardly by the control system 41 to move the two clamping units 23B to respectively move on the two sides of the corresponding rail 51. With reference to FIGS. 6 and 9, the at least one photography unit 16 can be disposed on the bogie 42 of the train 40 to capture images of the two rails 51 of the track 50.

Figure 12:
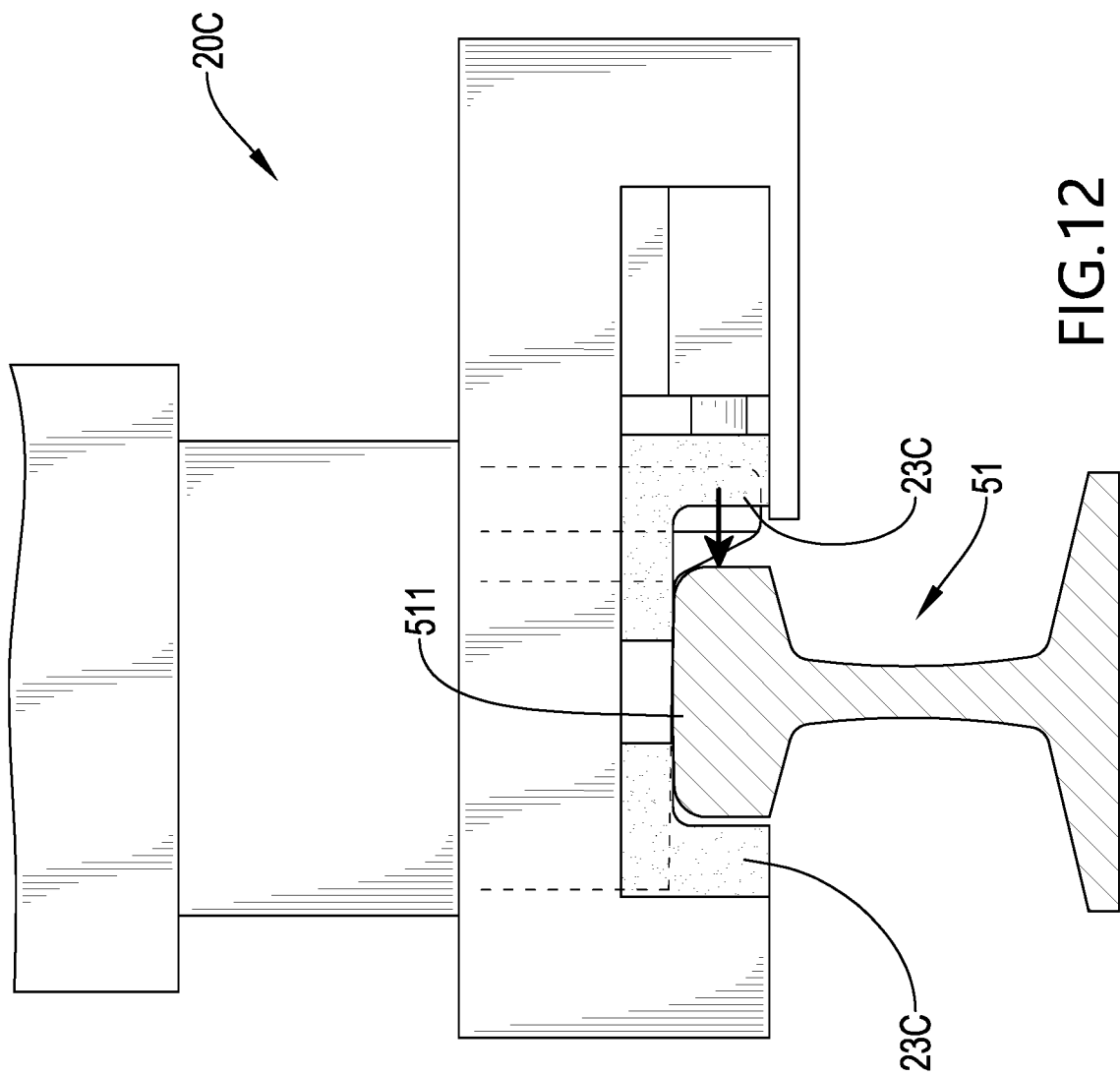
FIG. 12 is an enlarged side view in partial section of a fourth embodiment of an auxiliary braking module of the train forewarning braking system in accordance with the present invention.

With reference to FIG. 12, a fourth embodiment of an auxiliary braking module 20C of a train forewarning braking system in accordance with the present invention is substantially the same as the third embodiment except for the following features. In the fourth embodiment of the present invention, each one of the two clamping units 23C has a cross section being L-shaped, so that each clamping unit 23C can contact one of the two sides and a top surface of the rail head 511 of the corresponding rail 51, thereby increasing the friction area to improve the braking force of the train 40 and to shorten the distance required for braking. Furthermore, the clamping unit 23C with the L-shaped cross section can also be applied to the above-mentioned first to third embodiments of the present invention, and is not limited here. Additionally, when the fourth embodiment of the auxiliary braking module 20C is used, the operating principle and method of the fourth embodiment of the auxiliary brake module 20C are the same as those of the third embodiment of the auxiliary brake module 20B, and will not be described here.

With reference to FIG. 13, a fifth embodiment of an auxiliary braking module of a train forewarning braking system in accordance with the present invention is substantially the same as the second and third embodiments except for the following features. In the fifth embodiment of the present invention, the train forewarning braking system has multiple said auxiliary braking modules disposed on each one of the two rails 51 of the track 50 at spaced intervals, and each of the multiple said auxiliary braking modules can be one of the auxiliary braking modules 20, 20A, 20B, 20C of the above-mentioned first to fourth embodiments. Furthermore, the multiple auxiliary braking modules 20, 20A, 20B, 20C disposed on each one of the two rails 51 of the track 50 can be same or different, and are not limited here. In addition, the above-mentioned auxiliary braking modules 20, 20A, 20B, 20C can be disposed on the train 40 or the bogie 42 according to the needs of the user and the type or structure of the train 40.

Figure 14:
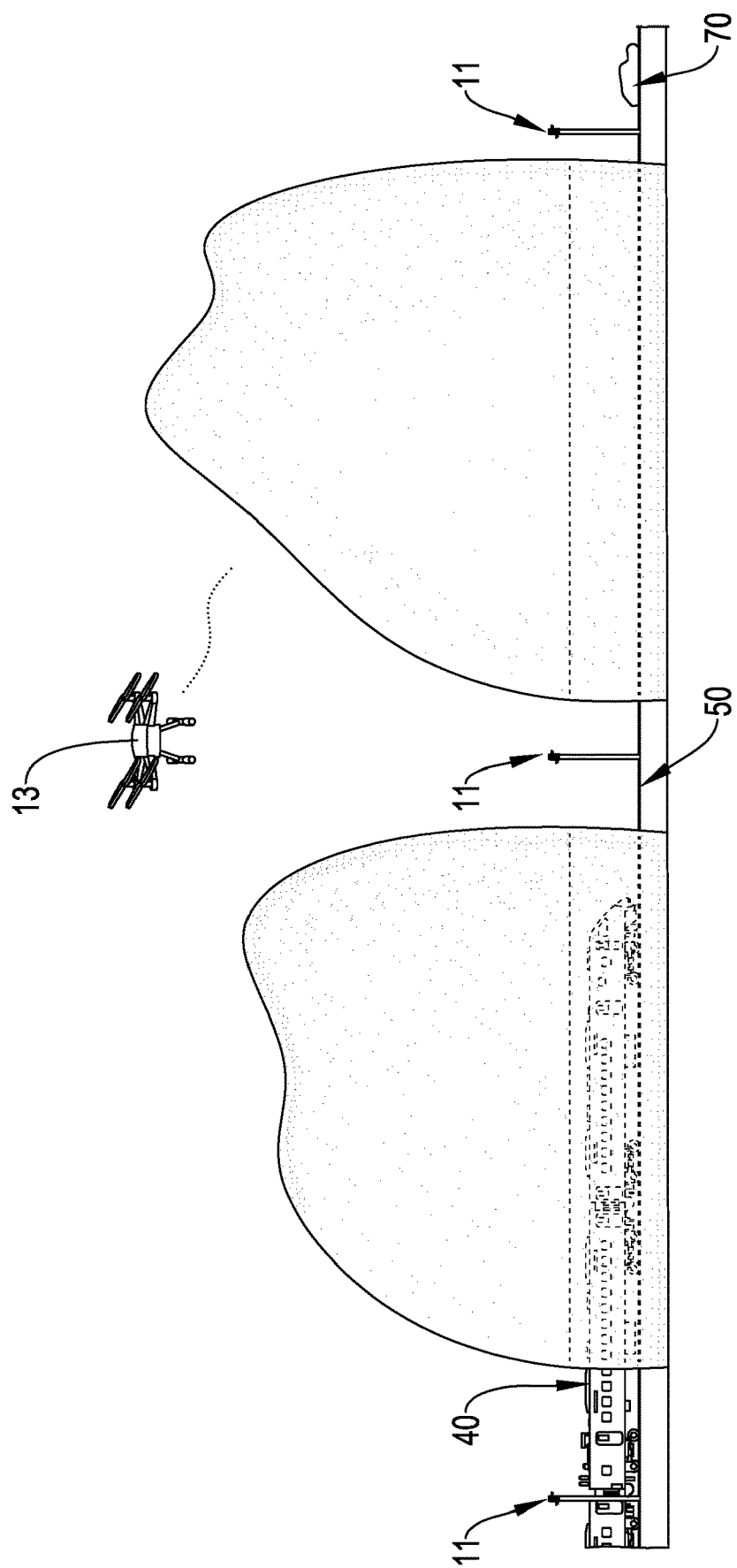
FIG. 14 is an operational perspective side view of the train forewarning braking system in FIG. 1.

With reference to FIGS. 2, 5, and 14, according to the above-mentioned technical features, when the train forewarning braking system of the present invention is used, the image monitoring module 10 at a relative position of the track 50 where the train 40 has not passed transmits images captured by the cameras 15 of the image capture units 11 located at the relative position and in front of the relative position to the display units 12 on the train 40. Then the train operator can judge whether there are safety concerns and need to consider braking through the image results of each relative position, and can also cooperate with the auxiliary unit 13 to capture relevant information at random points for the train operator to view and grasp the environmental conditions in the traveling route of the train 40. When the image capture unit 11 located in the traveling route of the train 40 captures an obstacle 70 that may affect the safety of the train 40, the train operator can brake with enough time and distance to effectively avoid emergencies or accidents in a short distance to effectively achieve an effect of instant braking.

With reference to FIGS. 7, 8, 10, and 13, during a braking process of the train forewarning braking system of the present invention, the auxiliary braking modules 20, 20A, 20B, 20C disposed on each bogie 42 of the train 40 can be driven by the control system 41 to activate the driving units 22, 22B to enable the two clamping units 23, 23B, 23C respectively pressing against the two sides of the rail head 511 of a corresponding rail 51 to provide an auxiliary braking effect to the train 40. Then train forewarning braking system of the present invention can quickly achieve a safe and effective braking effect in a shorter time and distance for the train 40, can instantly and quickly carry out safety control of train driving, and effectively provide an early warning effect, improve driving safety, and provide an auxiliary braking effect.

Furthermore, in order to prevent the auxiliary braking modules 20, 20A, 20B, 20C from operating at the turnout of the track 50 and being unable to brake effectively, providing images of the track 50 via the photography units 16 of the image monitoring module 10 or disposing position sensing-transmitting devices on each rail 51 to determine that the auxiliary braking module 20, 20A, 20B, 20C will brake at the broken end of the turnout, the train forewarning braking system of the present invention will not drive the auxiliary braking module 20, 20A, 20B, 20C at the broken end of the turnout and then brakes the train 40 after the turnout to avoid mis-clamping or causing the train 40 off the track 50 due to collision between the auxiliary braking modules 20, 20A, 20B, 20C and the turnout.

Figure 15:
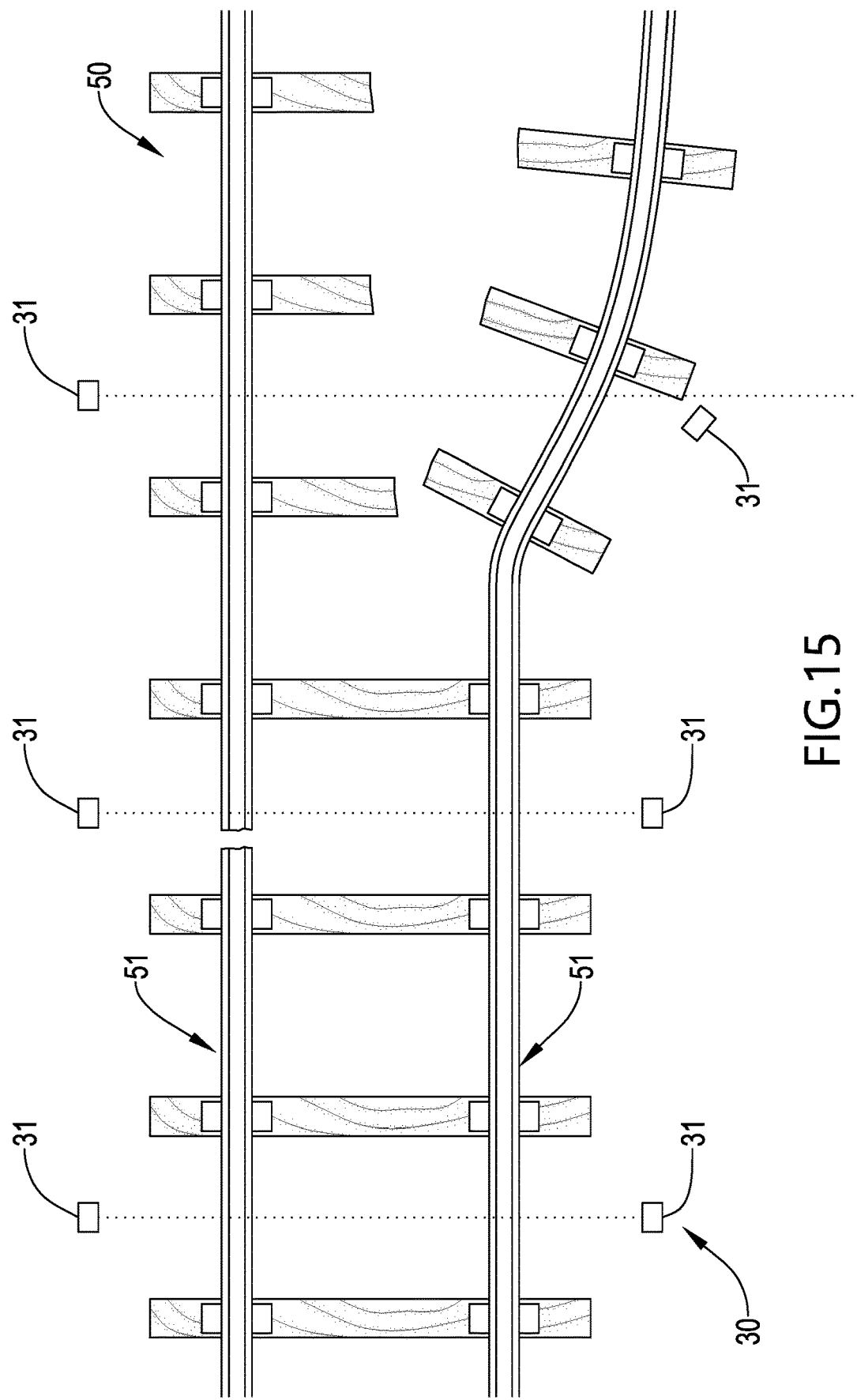
FIG. 15 is an operational top side view of a track detection module of the train forewarning braking system in FIG. 1.

With reference to FIGS. 5 and 15, the train forewarning braking system of the present invention has a track detection module 30 disposed on two sides of the two rails 51 of the track 50 to detect whether the two rails 51 are broken or bent. The track detection module 30 is electrically connected to the control system 41 of the train 40 and the traffic control center 60, detects and sends information of the two rails 51 to the control system 41 and the traffic control center 60, allowing the train operator and personnel of the traffic control center 60 to monitor and confirm the status of the track 50. The track detection module 30 has multiple sensors 31 disposed on one of two sides of each one of the two rails 51 at a spaced interval to detect whether the shape of the corresponding rail 51 is abnormal (broken or bent, etc.).

Figure 16:
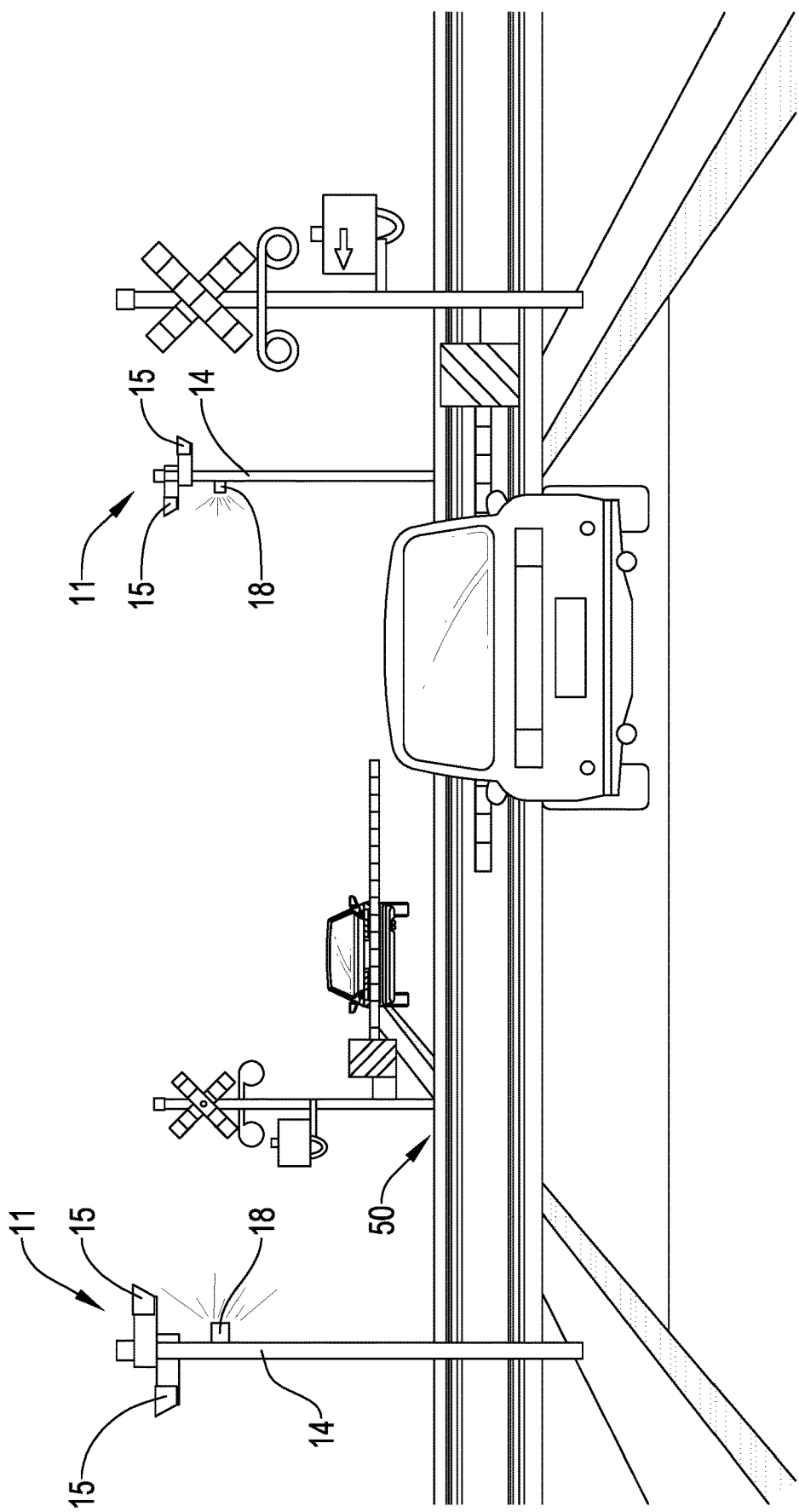
FIG. 16 is a further operational perspective view of the train forewarning braking system in FIG. 1.

Furthermore, with reference to FIG. 16, at least one of said image capture units 11 is disposed on two sides of a level crossing, or at least one of said image capture units 11 is disposed on two sides of two directions of a road, and the two cameras 15 of each one of the image capture units 11 respectively face two different directions of the track 50. The image monitoring module 10 has a warning device 18 such as lights or sounds disposed on the fixed rod 14 of each one of the image capture units 11. If there are obstacles such as animals, pedestrians or vehicles on the track 50, the warning devices 18 on the fixed rods 14 can be used to provide an effect of driving away. In addition, each one of the image capture units 11 of the image monitoring module 10 captures images of slope slip conditions and bridge conditions around the track 50 and transmits images back to the train 40 and the traffic control center 60 to provide monitoring effects on the slope slip conditions and bridge conditions.

Additionally, images and signals of the train forewarning braking system of the present invention can be transmitted wirelessly such as via 5G transmission, and can be transmitted by wired contact on the train 40 in a traveling route. For example, a power supply system uses a carrier wave type or wired transmission on the track 50 to transmit images and signals to the traffic control center 60 and the control system 41 of the train 40. When the train 40 moves into a tunnel, if there is an obstacle in wireless signal transmission, it can be switched to wired contact transmission to ensure signal reliability. Moreover, when transmitting signals wirelessly, a communication base station can be used in conjunction with lines of the track 50, a radio, a communication base station, or wireless satellite to transmit signals.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A train forewarning braking system disposed between a train and a track for the train to travel on, electrically connected to a traffic control center, and comprising:
   an image monitoring module disposed around the track, electrically connected to a control system of the train and the traffic control center, and having
      multiple image capture units disposed at spaced intervals near the track and electrically connected to the control system of the train to capture images of the environment around the track sequentially following a direction of travel of the train and transmitting the images to the control system of the train and the traffic control center; and
      multiple display units, a subset of the multiple display units being disposed on the train and the rest of the multiple display units being disposed on the traffic control center, the multiple display units being electrically connected to the control system to display the images captured by each one of the image capture units respectively and sequentially; and
   an auxiliary braking module disposed on a bogie of the train and facing the track, the auxiliary braking module being electrically connected to the control system, wherein
   the images captured by the multiple image capture units and displayed on the multiple display units respectively and sequentially are visible to a train operator in the train and controllers in the traffic control center synchronously.

2. The train forewarning braking system as claimed in claim 1, wherein
   the auxiliary braking module has
      a body securely mounted on a bottom of the bogie, extended toward one of two rails of the track, and having
         a chamber formed in the body; and
         an opening formed through a bottom of the body, communicating with the chamber, and spanning two sides of the corresponding rail to enable a rail head of the corresponding rail to be mounted in the chamber;
      a driving unit disposed in the chamber of the body and disposed toward the rail head of the corresponding rail; and
      two clamping units disposed in the chamber of the body, respectively located at two sides of the rail head of the corresponding rail, one of the two clamping units disposed on a side wall of the chamber away from the driving unit and faced one of the two sides of the rail head of the corresponding rail, and the other one of the two clamping units disposed on the driving unit and faced the other one of the two sides of the rail head of the corresponding rail.

3. The train forewarning braking system as claimed in claim 2, wherein each one of the multiple image capture units has
   a fixed rod securely mounted near the track; and two cameras disposed on the fixed rod, electrically connected to the control system of the train, and respectively faced two different directions to capture images of the train approaching and moving away.

4. The train forewarning braking system as claimed in claim 2, wherein the image monitoring module has an auxiliary unit being an unmanned aerial vehicle, connected to the control system of the train to capture images around the train, transmitting the images to the train, and displaying the images on one of the display units.

5. The train forewarning braking system as claimed in claim 2, wherein
the driving unit of the auxiliary braking module has a driving rod telescopically moved toward or away from the rail head of the corresponding rail; and
one of the two clamping units is disposed on the driving rod of the driving unit to face one of the two sides of the rail head of the corresponding rail.

6. The train forewarning braking system as claimed in claim 2, wherein
the bottom of the body has a boat-shaped structure; and
the opening of the body has a cross section same as a cross section of the chamber to arrange the rail head of the corresponding rail in the chamber of the body.

7. The train forewarning braking system as claimed in claim 2, wherein the body of the auxiliary braking module has a lifting rod selectively moved toward or away from the rail head of the corresponding rail to enable the driving unit and the two clamping units disposed in the chamber of the body to approach or move away from the rail head of the corresponding rail.

8. The train forewarning braking system as claimed in claim 2, wherein each one of the two clamping units has a cross section being L-shaped to enable the clamping unit to contact one of the two sides and a top surface of the rail head of the corresponding rail.

9. The train forewarning braking system as claimed in claim 2, wherein the train forewarning braking system has multiple said auxiliary braking modules disposed on each one of the two rails of the track at spaced intervals.

10. The train forewarning braking system as claimed in claim 2, wherein the image monitoring module has at least one photography unit disposed in front, behind, below or in a carriage of the train, capturing images of the front, rear, bottom or the carriage of the train, and transmitting the images to the control system and the traffic control center.

11. The train forewarning braking system as claimed in claim 10, wherein the said at least one photography unit is disposed on the bogie of the train to capture images of the two rails of the track.

12. The train forewarning braking system as claimed in claim 11, wherein the train forewarning braking system has at least one driving recorder disposed in the train.

13. The train forewarning braking system as claimed in claim 2, wherein the train forewarning braking system has a track detection module disposed on two sides of the two rails of the track to detect whether the two rails are broken or bent, electrically connected to the control system of the train and the traffic control center, and detecting and sending information of the two rails of the track to the control system and the traffic control center.

14. The train forewarning braking system as claimed in claim 13, wherein the track detection module has multiple sensors disposed on one of the two sides of each one of the two rails at spaced intervals to detect whether the shape of the corresponding rail is abnormal.

15. The train forewarning braking system as claimed in claim 2, wherein each one of the image capture units of the image monitoring module has a warning device.

16. The train forewarning braking system as claimed in claim 2, wherein each one of the image capture units of the image monitoring module captures images of slope slip conditions and bridge conditions around the track and transmits images back to the train and the traffic control center.

17. The train forewarning braking system as claimed in claim 1, wherein each one of the multiple image capture units has
a fixed rod securely mounted near the track; and
two cameras disposed on the fixed rod, electrically connected to the control system of the train, and respectively faced two different directions to capture images of the train approaching and moving away.

18. The train forewarning braking system as claimed in claim 1, wherein the image monitoring module has an auxiliary unit being an unmanned aerial vehicle, connected to the control system of the train to capture images around the train, transmitting the images to the train, and displaying the images on one of the display units.

19. The train forewarning braking system as claimed in claim 1, wherein the train forewarning braking system has multiple said auxiliary braking modules disposed on each one of the two rails of the track at spaced intervals.

20. The train forewarning braking system as claimed in claim 1, wherein the image monitoring module has at least one photography unit disposed in front, behind, below or in a carriage of the train, capturing images of the front, rear, bottom or the carriage of the train, and transmitting the images to the control system and the traffic control center.

21. The train forewarning braking system as claimed in claim 20, wherein the said at least one photography unit is disposed on a bogie of the train to capture images of two rails of the track.

22. The train forewarning braking system as claimed in claim 21, wherein the train forewarning braking system has at least one driving recorder disposed in the train.

23. The train forewarning braking system as claimed in claim 1, wherein the train forewarning braking system has a track detection module disposed on two sides of two rails of the track to detect whether the two rails are broken or bent, electrically connected to the control system of the train and the traffic control center, and detecting and sending information of the two rails of the track to the control system and the traffic control center.

24. The train forewarning braking system as claimed in claim 23, wherein the track detection module has multiple sensors disposed on one of the two sides of each one of the two rails at spaced intervals to detect whether the shape of the corresponding rail is abnormal.

25. The train forewarning braking system as claimed in claim 1, wherein each one of the image capture units of the image monitoring module has a warning device.

26. The train forewarning braking system as claimed in claim 1, wherein each one of image capture units of the image monitoring module captures images of slope slip conditions and bridge conditions around the track and transmits images back to the train and the traffic control center.

* * * * *